United States Patent
Nakafuji

(10) Patent No.: US 11,140,355 B1
(45) Date of Patent: Oct. 5, 2021

(54) OPTICAL FREQUENCY IMAGING

(71) Applicant: Oceanit Laboratories, Inc., Honolulu, HI (US)

(72) Inventor: Glen Nakafuji, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 689 days.

(21) Appl. No.: 15/592,288

(22) Filed: May 11, 2017

Related U.S. Application Data

(60) Provisional application No. 62/334,639, filed on May 11, 2016.

(51) Int. Cl.
| | |
|---|---|
| H04N 5/222 | (2006.01) |
| H04N 5/00 | (2011.01) |
| G06T 7/00 | (2017.01) |
| H04N 5/77 | (2006.01) |
| H04N 7/18 | (2006.01) |
| H04N 5/33 | (2006.01) |
| G06T 7/90 | (2017.01) |

(52) U.S. Cl.
CPC ............... *H04N 5/77* (2013.01); *G06T 7/90* (2017.01); *H04N 5/33* (2013.01); *H04N 7/183* (2013.01); *G06T 2207/10016* (2013.01)

(58) Field of Classification Search
CPC . H04N 5/77; H04N 7/183; H04N 5/33; G06T 7/90; G06T 2207/10016; G06T 7/254; B64D 45/0053; G08B 17/125; G06K 9/6293; G06K 9/629; G06K 9/626; G06K 9/00771
See application file for complete search history.

(56) References Cited

U.S. PATENT DOCUMENTS

| | | | | |
|---|---|---|---|---|
| 6,184,792 | B1 * | 2/2001 | Privalov | F23N 5/082 |
| | | | | 250/336.1 |
| 2009/0040367 | A1 * | 2/2009 | Zakrzewski | B64D 45/0015 |
| | | | | 348/370 |
| 2012/0101747 | A1 * | 4/2012 | Kielkopf | G01M 3/002 |
| | | | | 702/51 |
| 2018/0328814 | A1 * | 11/2018 | Panda | G01M 7/08 |

\* cited by examiner

*Primary Examiner* — Mulugeta Mengesha
*Assistant Examiner* — Alazar Tilahun
(74) *Attorney, Agent, or Firm* — Fresh IP PLC; Clifford D. Hyra; Aubrey Y Chen

(57) ABSTRACT

Frequency imaging of different areas or object in an image is created by a visible light, infrared or other cameras taking multiple sequential images. The images are recorded and stacked. Pixels that vary in the images yield time varying data on a pixel by pixel basis. The time varying data is processed to extract pixel by pixel signal spectrum or another similar signal metric. Frequency at each pixel is displayed and distinguished, such as by recoloring the pixels based on spectral power rather than intensity contrast.

10 Claims, 1 Drawing Sheet

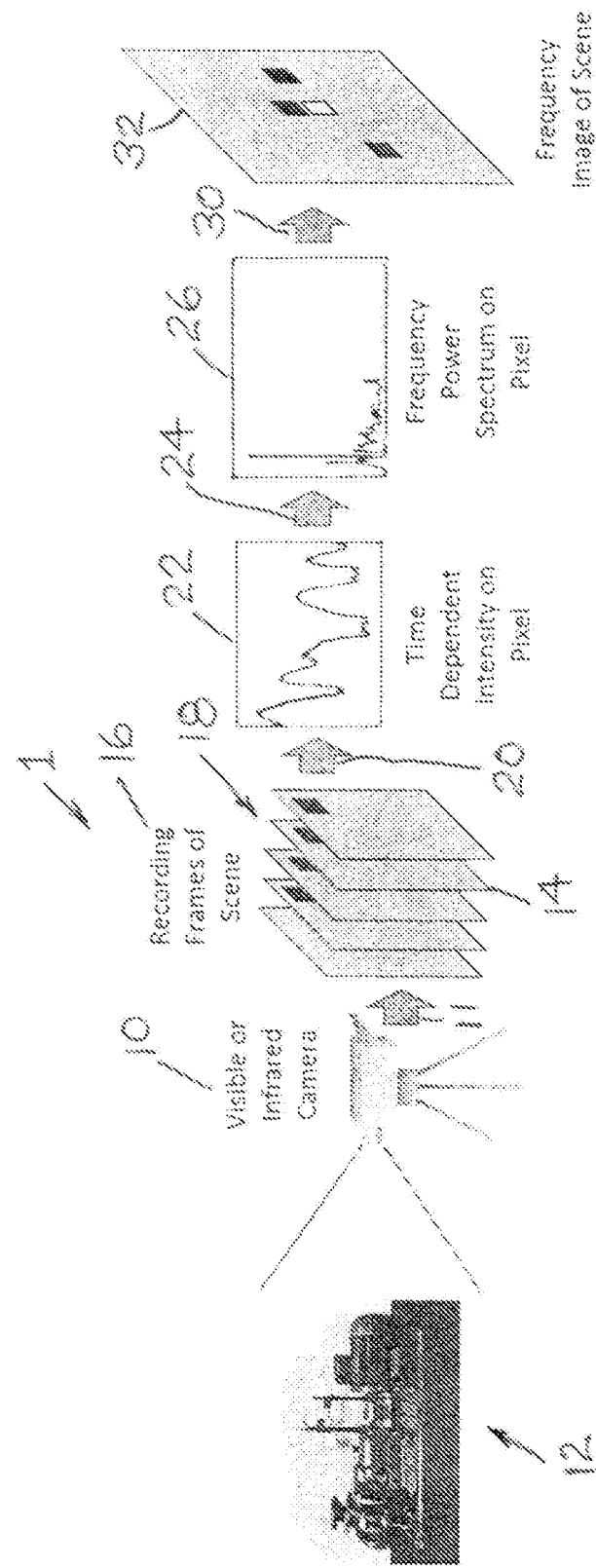

OPTICAL FREQUENCY IMAGING

This application claims the benefit of U.S. Provisional Application No. 62/334,639 filed May 11, 2016, which is hereby incorporated by reference in its entirety as if fully set forth herein.

FIELD OF THE INVENTION

The application relates generally to the processing and visualization of high frame count camera and sensor systems and devices that operate in the infrared and visible wavebands. Applications covered include, but are not limited to, conventional video processing for scene monitoring, situational awareness, data measurement, and recreation as well as high speed camera (visible and infrared) processing for industrial, defense and commercial industry.

BACKGROUND OF THE INVENTION

Conventional and specialized video camera technology rely on collecting light at a specific wavelength or range of wavelength to measure and visualize a scene or point. Cameras focus incoming light onto either a focal plane (made up of many pixels) to image a scene or onto a single pixel to measure light at a point. Conventional cameras use focal planes made of many pixels to provide high resolution images of scenes. The camera electronics attached to the focal planes control the speed at which a camera operates and determine how many frames or images, per second a camera can record and store. Conventional video cameras operate at speeds that range from a few frames per second to tens of frames per second. Specialized video cameras can operate up to 1000 frames per second with very specialized cameras capable of operating at even higher speeds. The speed of the camera comes at the cost of scene resolution with lower resolution cameras being capable of frame rates much higher than high resolution video. These factors hold true for camera technology operating in the visible and all infrared wavebands.

General techniques for interpreting the output of single shot cameras as well as video cameras can be generalized into two groups:
1. Pattern recognition, where images are identified by silhouette or shape feature and correlated to objects or actions. Examples of this may be identification of a person in a video image or recording a bomb explosion from an unmanned aerial vehicle in a combat zone.
2. Contrast, where images are identified by areas of color or contrast intensity. Examples may be locating a body of water in a dry area scene or the thermal heat signature of a person hiding in vegetation from an infrared camera.

Both of these methods are useful but have reached the limit of utility in extracting new information from new camera technology.

Needs exist for new methods of extracting new information from new camera technology.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

The invention provides a new processing and visualization technique called Frequency Imaging that provides an extra dimension of information for processing and displaying video information from optical and infrared camera technology. Frequency Imaging involves processing and visualizing images in the frequency domain, rather than time domain, to extract and visualize time varying pieces of a scene to reveal objects, actions and behavior not detectable using pattern recognition or contrast techniques. Frequency Imaging can be applied in cases where cameras with high frame rate are used or, in cases where slower cameras are used, with much longer video recording time. Utilization of high speed cameras can reveal very high frequency behavior not visible by the naked eye. An example would be to use a 10,000 frame per second infrared camera to view a jet engine in operation. Conventional infrared video would show the thermal contrast of the jet plume, whereas a frequency image would show at what frequencies the plume or machinery is oscillating. This extra piece of information can be very useful depending upon the application and context of a situation. Frequency imaging may be used for presence detection of objects or behavior not ordinarily visible in a conventional image, or it could be used to remotely diagnose the operational state of a device or machine.

The general approach to frequency imaging is to obtain the time varying data from an image on a pixel by pixel basis and to conduct signal processing to extract the frequency spectrum or similar signal metric and then use that information to recolor pixels to visualize the scene based on spectral power rather than intensity contrast or object color.

The invention uses a camera configured for taking multiple sequential images of a scene. A digital recorder is connected to the camera and is adapted for recording the multiple sequential images of the scene and adapted for stacking the recorded multiple sequential images in a time sequence. A computer is connected to the digital recorder. The computer is adapted for obtaining intensity versus time for the same pixel print on each of the recorded multiple sequential images of the scene. The computer is configured for transforming a time series of data from each pixel point to frequency information at each pixel. The computer is adapted for subdividing each pixel into spectral bins and to indicate energy has been recorded in the pixel. The computer is adapted to display on an image of the scene an energy spectrum according to frequency content of each pixel and to provide distinguishing features of the pixels according to the frequency content of each pixel.

The camera is a visible light camera, or an infrared camera.

A video camera may be used.

The camera may be capable of operating at speeds of about 1000 frames per second.

In one embodiment, the computer is configured to assign distinct colors to indicate distinct frequencies in a display of the frequency imaging of the scene for display of frequency behavior in different elements in the scene.

The camera is directed to make multiple sequential images of operating machinery or is directed to make the multiple sequential images is infrastructure or far away objects or space.

One scene to which the camera is directed makes multiple sequential images is a jet engine.

Another camera is directed to make the multiple sequential images is a jet engine exhaust plume.

A method of the invention includes displaying frequency content of each pixel on an image by providing a camera and taking sequential images of a scene with the camera.

The new Frequency Imaging is useful in sea surface monitoring for the detection of surface and subsurface objects.

The sequential images of the scene are provided to a computer or a digital recorder for recording and stacking the sequential images of the scene in a time sequence.

A computer obtains intensity versus time for each pixel point from the recorded and stacked sequential images of the scene. Transforming time series of data at each pixel from a time domain to a frequency domain and yielding frequency information at each pixel is done in a computer using Fourier transforms or other appropriate procedures. Frequency information is subdivided into spectral bins and indicating energy in each pixel. Each pixel is assigned a color according to the frequency information of that pixel.

A display of an image of the scene is provided with each of the pixels colored according to frequency of energy recorded at that pixel.

One new method includes sequentially taking multiple sequential images, obtaining time varying data from sequential images, processing multiple sequential images pixel by pixel for intensity in the same pixel in sequential images versus time, and transforming each pixel from time domain to frequency domain and providing frequency content of each pixel.

The frequency content of each pixel is displayed in at least one of the sequential images.

A distinguishing feature is provided to each pixel according to frequency content of that pixel.

One assigning of a distinguishing feature comprises assigning a color according to the frequency content of each pixel.

These and further and other objects and features of the invention are apparent in the disclosure, which includes the above and ongoing written specification, with the claims and the drawings.

BRIEF DESCRIPTION OF THE DRAWING

The accompanying drawing, which are incorporated herein and form a part of the specification, illustrate exemplary embodiments and, together with the description, further serve to enable a person skilled in the pertinent art to make and use these embodiments and others that will be apparent to those skilled in the art.

FIG. 1 shows the new frequency imaging.

DETAILED DESCRIPTION

Frequency Image Reconstruction

As shown in FIG. 1, Frequency Imaging 1 works by using a visible or infrared camera 10 to take images of an object 12, in this case a machine, taking multiple frames 14 of image data. Camera 10 provides 11 frames 14 to a computer for recording and "stacking" 16 them in a time sequence 18. The computer then obtains 20 intensity versus time 22 for each pixel point. The time series of data 22 at each pixel is then transformed 24 from the time domain 22 to frequency domain 26 through Fourier transform 24 or related technique to yield frequency information 28 at that pixel. The spectrum at each pixel is then subdivided 30 into spectral bins which indicates where the energy in the pixel power spectrum lies. This binning structure can then be used to color the pixel in an image display 32 according to the frequency content of the pixel. This scheme allows an image to be reconstructed according to a scene's frequency content and not pixel intensity.

The general frequency image steps are as follows:

Step 1: Video output streams data into a computer.

Step 2: Data from each pixel in a frame is stored in "time slice" groups in computer memory.

Example: for 1000 Hz video, collect 2000 data points over 2 second "time slice" interval and store in array.

Step 3: signals process pixel data in each "time slice". One can use Fast Fourier Transform, as an example, to convert intensity versus time data per pixel into Frequency Power Spectrum per pixel per time slice.

Step 4: In a context scaling step, each pixel spectrum is assessed to determine where the signal power lies in each pixel spectrum (i.e. if majority of signal power lies between 100-200 Hz or if there is a spike in frequency at 1000 Hz) or if there are characteristic frequency lines that pop up in the time slice of a given pixel. These characteristics are then related to a color or intensity for visualization.

Step 5: an image is reconstructed using the color scales determined in step 4, thereby providing a new "image" that shows where the strongest frequency pixels and areas are.

Examples of potential application areas for Frequency Imaging include:

1. Medical imaging.
2. Commercial unmanned aerial vehicle (UAV) detection— air safety, privacy.
3. Defense UAV detection—vehicle identification.
4. Maintenance diagnosis for industrial machinery—looking for damaged/failing parts of operating machinery.
5. Electrical maintenance—looking for electrically induced vibrations from short circuits or failing circuitry.
6. Biometric identification.
7. Electronic entertainment—frimage apps.
8. Aircraft detection and identification.
9. Satellite and space detection and identification.
10. Geologic monitoring.
11. Windmill monitoring for renewable energy.
12. Rig, site or facility monitoring in the oil and gas or related industries.
13. Large network activity monitoring in an installation or facility (i.e., military base, large company, etc.).

By noninvasive video visual and infrared imaging of body parts or of whole bodies, storing time sliced groups of frames and pixels and extracting data from individual pixels, differences in intensity versus time and scaling characteristic frequency lines and reconstructing the image frame showing in selected characteristic colors and intensity problem areas requiring interventions or changes.

UAVs may be identified as to type, model and age and individual characteristics using frequency imaging and the steps of the invention.

Aircraft and UAV may have periodic, preflight and inflight evaluations using high speed cameras and producing data streams of exhausts, engines, control surfaces and bodies and parts thereof. The same steps are used for storing data from each pixel in a frame stored in time slice groups. Intensity versus time data for each pixel is converted into frequency power spectrum per pixel time slice. Context scaling accesses each pixel for normal frequencies and converts the pixel image characteristics to a color and intensity for visualizing, and the image is reconstructed using the color scales to show the strongest frequency pixels locations.

Context Auto-Scaling

The display of a Frequency Image has meaning if it is viewed in the context of a specific application. Different viewing criteria will determine what frequency ranges or thresholds would need to be marked to provide value and utility to a user. Examples of this would be imaging rotating machinery to examine for out of tolerance components during operation or typing aircraft from a long distance. Maintaining arbitrary color or intensity scale settings for adjustment is necessary to convert the general tool of frequency imaging into a specific tool for a given application. Embedding this feature into the Frequency Imaging method is key to providing value to a user.

The invention provides a frequency imaging method of visualizing video from visible or infrared cameras to extract new and different information from scenes.

The invention also provides an approach to tailor the video display output to give context to the frequency image for defense, commercial and industrial applications.

While the invention has been described with reference to specific embodiments, modifications and variations of the invention may be constructed without departing from the scope of the invention, which is defined in the following claims.

I claim:

1. Apparatus comprising:
    a camera configured for taking multiple sequential images of a scene,
    a digital recorder connected to the camera and adapted for recording the multiple sequential images of the scene and adapted for stacking the recorded multiple sequential images in a time sequence,
    a computer connected to the digital recorder and adapted for obtaining intensity versus time for each pixel on the recorded multiple sequential images of the scene, the computer being configured for transforming a time series of data from pixel points to frequency information at the same pixel points, the computer being adapted to indicate where energy lies in the pixels, the computer being adapted to display an energy spectrum according to frequency content of each pixel and to distinguish features of each pixel according to the frequency content of pixels or frequency narration in the same pixels,
    wherein the computer is configured to:
        convert pixel image characteristics of each pixel in the multiple sequential images to a specific color, and
        reconstruct each of the multiple sequential images to a colored image displaying a plurality of colors, each of the colored images thereby displaying frequency behavior of each of the pixels.

2. The apparatus of claim 1, wherein the camera is a visible light camera.

3. The apparatus of claim 1, wherein the camera is an infrared camera.

4. The apparatus of claim 1, wherein the camera is a video camera.

5. The apparatus of claim 1, wherein the camera is capable of operating at speeds in excess of 1000 frames per second.

6. The apparatus of claim 1, wherein the scene to which the camera is directed is operating machinery.

7. The apparatus of claim 1, wherein the scene to which the camera is directed to make the multiple sequential images is infrastructure.

8. The apparatus of claim 1, wherein the scene to which the camera is directed to make the multiple sequential images is a jet engine.

9. The apparatus of claim 1, wherein the scene to which the camera is directed to make the multiple sequential images is a jet engine exhaust plume.

10. The apparatus of claim 1, wherein the multiple sequential images are taken of one or more distant objects.

\* \* \* \* \*

UNITED STATES PATENT AND TRADEMARK OFFICE
CERTIFICATE OF CORRECTION

| | |
|---|---|
| PATENT NO. | : 11,140,355 B1 |
| APPLICATION NO. | : 15/592288 |
| DATED | : October 5, 2021 |
| INVENTOR(S) | : Glen Nakafuji |

It is certified that error appears in the above-identified patent and that said Letters Patent is hereby corrected as shown below:

In the Specification

On Column 1, after Line 6 insert, therefor:
-- STATEMENT REGARDING FEDERALLY SPONSORED RESEARCH OR DEVELOPMENT
The invention described herein was made with U.S. government ("Government") support under Contract No. N68335-16-C-0057, awarded by the U.S. Department of the Navy. As a result, the Government has certain rights in this invention. --

Signed and Sealed this
Thirtieth Day of May, 2023

Katherine Kelly Vidal
*Director of the United States Patent and Trademark Office*